United States Patent [19]

Shaw et al.

[11] Patent Number: 4,778,239

[45] Date of Patent: Oct. 18, 1988

[54] FEED-BACKWARD LATTICE ARCHITECTURE AND METHOD

[75] Inventors: H. John Shaw; Behzad M. R. Moslehi, both of Stanford, Calif.

[73] Assignee: Litton Systems, Inc., Beverly Hills, Calif.

[21] Appl. No.: 9,967

[22] Filed: Feb. 2, 1987

[51] Int. Cl.$^4$ .............................................. G02B 6/28
[52] U.S. Cl. ............................... 350/96.16; 350/96.15; 455/612
[58] Field of Search ............... 350/96.15, 96.16, 96.29; 455/610, 612

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 TS |
| 4,166,946 | 9/1979 | Chown et al. | 250/199 |
| 4,294,513 | 10/1981 | Nelson et al. | 350/96.29 |
| 4,301,543 | 11/1981 | Palmer | 455/612 |
| 4,307,933 | 12/1981 | Palmer et al. | 350/96.16 |
| 4,307,937 | 12/1981 | Gordon | 350/96.29 |
| 4,360,272 | 11/1982 | Schmadel et al. | 356/352 |
| 4,368,981 | 1/1983 | Ozeki | 356/352 |
| 4,378,143 | 3/1983 | Winzer | 350/96.15 |
| 4,443,700 | 4/1984 | Macedo et al. | 250/227 |
| 4,457,581 | 7/1984 | Johnson et al. | 350/96.16 |
| 4,490,163 | 12/1984 | Jochem et al. | 65/4.21 |
| 4,493,528 | 1/1985 | Shaw et al. | 350/96.15 |
| 4,505,587 | 3/1985 | Haus et al. | 356/345 |
| 4,525,818 | 6/1985 | Cielo et al. | 367/149 |
| 4,530,603 | 7/1985 | Shaw et al. | 356/345 |
| 4,545,253 | 10/1985 | Avicola | 73/655 |
| 4,552,457 | 11/1985 | Giallorenzi et al. | 356/345 |
| 4,588,255 | 5/1986 | Tur et al. | 350/96.16 |
| 4,588,296 | 5/1986 | Cahill et al. | 356/350 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngguist et al. | 356/345 |

FOREIGN PATENT DOCUMENTS

| | | |
|---|---|---|
| 0023345 | 2/1981 | European Pat. Off. |
| 3224775 | 1/1983 | Fed. Rep. of Germany |
| 2473-188 | 7/1981 | France |
| 58-211119 | 12/1983 | Japan |
| 8301303 | 4/1983 | PCT Int'l Appl. ............... 356/350 |
| 2096762 | 10/1982 | United Kingdom |
| WO79/00377 | 6/1979 | World Int. Prop. O. |
| WO83/02496 | 7/1983 | World Int. Prop. O. |
| WO85/00221 | 1/1985 | World Int. Prop. O. |
| WO83/03684 | 10/1987 | World Int. Prop. O. |

OTHER PUBLICATIONS

Sheem et al., "Wavelength Monitoring of Single-Mode Diode Laser Using Guided-Wave Interferometer", *Optics Letters*, May 1980, vol. 5, No. 5, pp. 179–181.

Davis, "Fiber Optic Sensors:an Overview", SPIE, vol. 478, May 1984, pp. 12–18.

Pavlath et al., "Applications of All Fiber Technology to Sensors", *Proc. SPIE*, (Int. Soc. Opt. Eng.), vol. 412, 5–7, Apr. 1983, pp.70–79.

Dandridge, et al., "Phase Compensation in Interferometric Fiber-Optic Sensors", Optics Letters, vol. 7, No. 6, Jun. 1982, pp. 279–281.

(List continued on next page.)

Primary Examiner—John Lee
Attorney, Agent, or Firm—John H. Lynn

[57] ABSTRACT

A lattice includes a transmit bus formed of a single mode optical fiber and a return bus formed of a multimode optical fiber. An optical transmitter applies input signals to the transmit bus, and an optical receiver receives the signals guided by the return bus. The return fiber is looped around the couplers so that the signal output from each segment of the lattice passes through all the preceding segments before reaching the receiver. The optical couplers have asymmetric coupling efficiencies so that recirculating light is attenuated.

4 Claims, 2 Drawing Sheets

OTHER PUBLICATIONS

Nelson et al., "Passive Multiplexing System for Fiber-Optic Sensors", *Applied Optics*, vol. 19, No. 17, 9/1980, pp. 2917–2920.

Kersey et al., "Demodulating Scheme Fibre Interferometric Sensors Employing Laser Frequency Switching", *Electronics Lett.*, vol. 19, No. 3, pp. 102–103 (2/3/83).

Nelson et al., "Passive Multiplexing Techniques for Fiber Optic Sensor Systems", I.F.O.C., 3/1981, pp. 27–30.

Bergh et al., "Single-Mode Fibre Optic Directional Coupler", Mar. 27, 1980, *Electronics Lett.*, vol. 16, No. 7, pp. 260–261.

Brooks et al., "Coherence Multiplexing of Fiber-Optic Interferometric Sensors", *Journal of Lightwave Technology*, vol. LT-3, No. 5, Oct. 1985, pp. 1062–1071.

Digonnet et al., "Analysis of a Tunable Single Mode Optical Fiber Coupler", *IEEE Journal of Quantum Electronics*, vol. QE-18, No. 4, Apr. 1982, pp. 746–754.

Jackson et al., "Optical Fiber Delay-Line Signal Processing", *IEEE Transactions on Microwave Theory and Techniques*, vol. MTT-33, No. 3, Mar. 1985, pp. 193–210.

Tur et al., "Fiber-Optic Signal Processor with Applications to Matrix-Vector Multiplication and Lattice Filtering", *Optics Letters*, vol. 7, No. 9, Sep. 82, pp. 463–465.

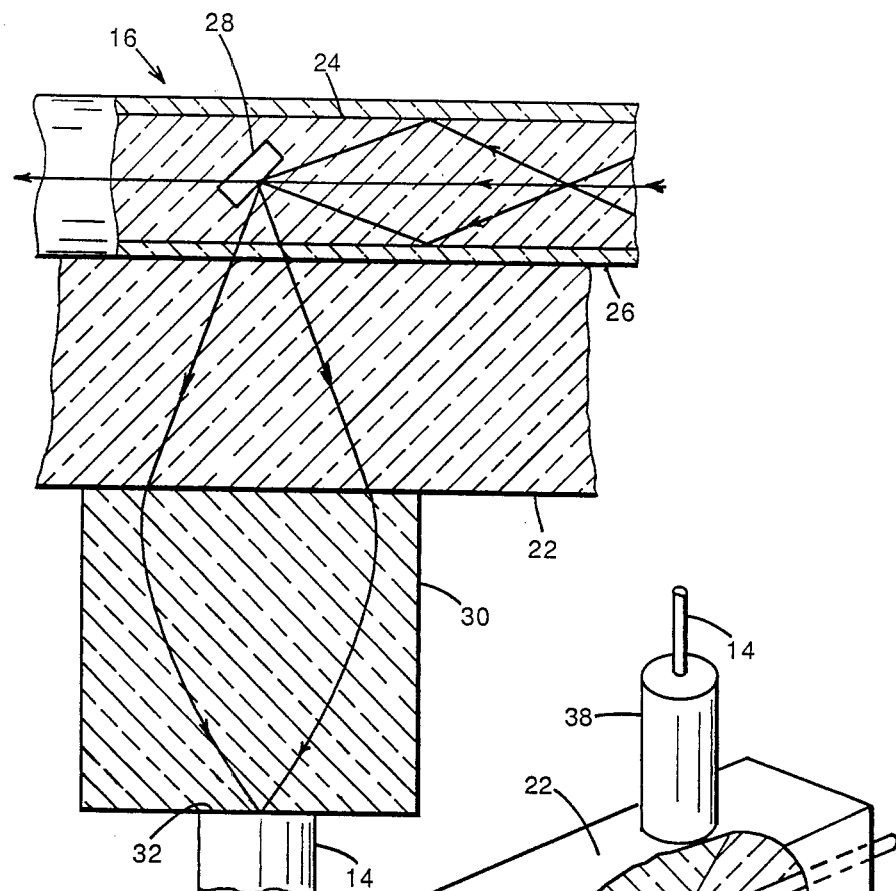
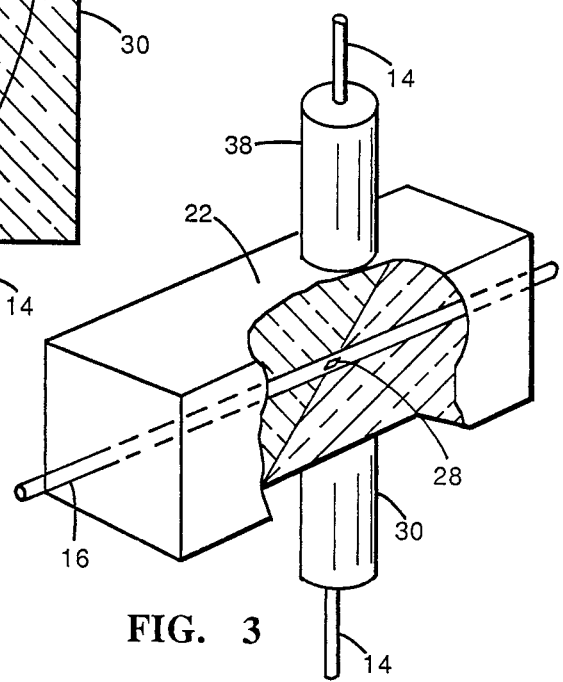

FEED-BACKWARD LATTICE ARCHITECTURE AND METHOD

BACKGROUND OF THE INVENTION

This invention relates generally to apparatus and methods for signal processing and sensing and particularly to fiber optic lattice architectures for signal processing applications and sensing changes in a physical parameter.

An optical fiber comprises a central core and a surrounding cladding. The refractive index of the core is greater than that of the cladding, and the diameter of the core is so small that light guided by the core impinges upon the core-cladding interface at an angle less than the critical angle for total internal reflection.

A light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate unattenuated are the normal modes. A single mode fiber will propagate only one spatial distribution of energy, that is, one normal mode, for a signal of a given frequency. A multimode fiber will propagate more than one normal mode of a given frequency. The number of guided modes in an optical fiber depends upon the diameter of the core.

Optical fibers are useful in signal processing systems because they provide greater rates of information transfer than is possible with wires carrying electrical signals and because light signals in optical fibers provide more communications channels than lower frequency electromagnetic waves.

Optical fiber lattice architectures have been described in the literature for signal processing applications. These lattice structures have employed symmetrical optical couplers and all single-mode optical fibers. See for example B. Moslehi, et al., "Fiber-Optic Lattice Signal Processing," *IEEE Proceedings*, Vol. 72, No. 7, pp. 909–930 (1984), and K. P. Jackson, et al., "Optical Fiber Delay Line Signal Processing," *IEEE Transactions on Microwave Theory and Techniques*, Vol. MTT-33, No. 3, pp. 193–210 (1985).

A systolic system includes a set of interconnected cells that are each capable of performing some simple operation. In a systolic system, the data flow is in a pipelined fashion. The data passes through many processing elements before leaving the system. Pipelining permits processing to proceed concurrently with input and output, thereby minimizing overall execution time. Systolic systems thus provide the advantages of effective use of data with high computation throughput, simple and regular data flows, use of simple and uniform cells, and modular expandability.

Most prior art lattice systolic multiplier structures include loops that permit recirculation of unwanted signals. See for example, U.S. Pat. No. 4,588,255, the disclosure of which is incorporated by reference into this disclosure. Such systems require considerable time delay for recirculations or echoes from one input pulse sequence to die out before another input pulse sequence can be launched. This time delay in recirculating lattice structures limits the average duty cycle and the total data throughput of these structures.

Optical fibers are sensitive to a large number of physical phenomena, such as acoustic waves and temperature fluctuations. Exposure to such phenomena changes the amplitude, phase or polarization of light guided by the fiber. Optical fibers have been used as sensing elements in microphones, hydrophones, magnetometers, accelerometers, electric current sensors and other devices.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

SUMMARY OF THE INVENTION

This invention provides an improved optical fiber lattice architecture having improved efficiency, having an increased average duty cycle, and not involving recirculations of input light. The invention has use in fiber optic signal processing and sensing applications.

A feed-backward fiber optic lattice structure according to the present invention comprises an input optical fiber bus formed of a single mode optical fiber and an output bus formed of a multimode optical fiber. An optical receiver receives optical signals guided by the output bus. A plurality of optical couplers are formed between the input optical fiber bus and the output bus. The optical couplers divide the lattice into a multiplicity of segments, and the output bus is formed into a loop around each optical coupler so that the output of any segment propagates through all the preceding segments before reaching the optical receiver.

The feed backward fiber optic lattice structure according to the invention includes optical couplers that couple light between single mode and multimode fibers. These couplers have asymmetrical coupling efficiencies and are connected such that the amplitudes of recirculating pulses in the lattice are attenuated.

The method of the invention for forming a feed-backward fiber optic lattice structure comprises the steps of guiding an incident optical signal on a single mode transmit optical fiber; providing a return optical fiber formed of a multimode optical fiber for guiding signals in a direction opposite to the direction of the incident signal; detecting optical signals from the return optical fiber; forming a plurality of optical couplers between the transmit and return optical fibers to divide the lattice into a multiplicity of segments; and forming a loop in the return fiber at each optical coupler so that the return signal from the $m^{th}$ lattice segment propagates through the first $(m-1)$ lattice segments before impinging upon the detector.

The method may further include the steps of forming all of the optical couplers to have asymmetrical coupling efficiencies; and connecting the couplers such that the amplitudes of recirculating pulses in the lattice are attenuated.

BRIEF DESCRIPTION OF THE DRAWINGS

FIG. 2 is a perspective view of an asymmetrical fiber optic directional coupler that may be included in a lattice architecture according to the invention;

FIG. 3 is a cross sectional view of the asymmetrical fiber optic directional coupler of FIG. 2;

DESCRIPTION OF THE PREFERRED EMBODIMENT

Figure 1:
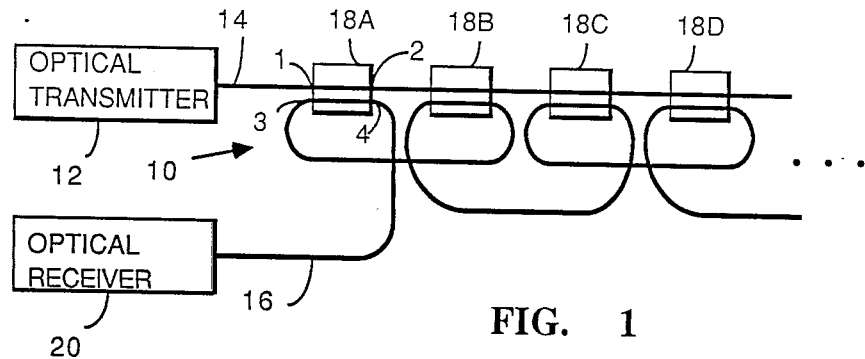
FIG. 1 is a schematic illustration of a lattice architecture according to the invention.

Referring to FIG. 1, a fiber optic lattice 10 according to the invention includes an input optical fiber bus 14, an optical fiber output bus 16 and a plurality of optical couplers 18A, 18B, etc. that couple optical signals between the optical fibers 14 and 16. The input optical fiber bus 14 is formed of a single mode optical fiber, and the output bus 16 is formed of a multimode optical fiber. The optical transmitter 12 provides optical signals to the input optical fiber bus 14, and an optical receiver 20 receives signals guided by the output bus 16.

The fiber 14 guides light from the input optical fiber bus 14 to port 1 of the coupler 18A. Most of the incident light remains in the fiber 14 and exits the coupler 18A at port 2. A small portion of the light incident upon the coupler 18A couples into the fiber 16 and exits the coupler 18A at port 4. The remaining input signal intensity then propagates through the input optical fiber bus 14 to port 1 of the coupler 18B. Again most of the incident light remains in the the input optical fiber bus 14 and exits the coupler 18B at port 2 for propagation to the next coupler 18C.

All of the couplers 18A, 18B etc. may be formed to have substantially identical structures. Therefore, only the structure of the coupler 18A is described herein. This structure is also described in U.S. patent application Ser. No. 744,502, filed June 13, 1985. The disclosure of that application is incorporated by reference into this disclosure.

FIGS. 2 and 3 show the multimode fiber 16 retained within a block 22 that may be formed of quartz. The multimode fiber 16 has a core 24 and a cladding 26. A reflector 28 is positioned on the central axis of the multimode fiber 16. The reflector 28 is oriented to reflect incident light so that it is nearly normal to the core/cladding interface. The reflected light therefore propagates out of the multimode fiber 16. The reflector 28 is very small so that only a small fraction of the light in the multimode fiber impinges upon it. Therefore, only a small fraction of the light in the multimode fiber 16 is removed therefrom by the reflector 28.

Still referring to FIG. 2 and 3, the reflected light is directed toward a lens 30 that gathers the light removed from the multimode fiber 16 and focuses it upon an end 32 of the single mode fiber 14. Therefore, the light removed from the multimode fiber 16 is coupled into the single mode fiber 14.

A lens 38 focuses light guided by the single mode fiber 14 toward the multimode fiber 16 onto the reflector 28. The reflector 28 receives a large portion of the light in the single mode fiber 14. The reflector 28 is arranged to reflect light into a generally cone-shaped beam directed longitudinally along the axis of the multimode fiber 16. The cone-shaped beam preferably diverges so that all of the modes within its acceptance cone are excited. The modes may be equally excited by selecting the numerical aperture of the multimode fiber 16 such that only the portion of the reflected beam having a relatively uniform intensity is within the acceptance cone. The coupling is then greater for light going from the single mode fiber 14 to the multimode fiber 16 than for light going from the multimode fiber 16 into the single mode fiber 14.

The optical transmitter 12 may supply either periodically or aperiodically trains of optical pulses to the input optical fiber bus 14. These pulses preferably occur in a train at a prescribed rate and duty cycle. The output of the second loop in the fiber 16 propagates to the coupler 18A where most of the signal remains in the output bus 16 and is guided to the receiver. However, part of the signal is coupled into the input optical fiber bus 14 as a recirculated signal. Part of the recirculation is coupled into the output bus 16 while part of it is transmitted to other loops in the lattice 10. Similarly, the signals from the other loops in the lattice 10 are recirculated through all the preceding loops. The undesired terms are attenuated each time they cross couple.

The asymmetric coupler provides greater attenuation of the unwanted recirculations than would be possible with symmetric couplers. The asymmetric nature of the coupling causes the fraction of the recirculated pulses to be less than the portions of the input signal that are cross coupled into the receive fiber 16. The operation of the single mode fiber to multimode fiber coupler 18A is described below.

It is assumed that all the modes (N in number) of the multimode fiber 16 are equally excited and that intensity coupling ratios for the individual modes of the multimode fiber to the single-mode fiber (and vice versa) are the same and equal to a constant K. With this assumption, for each unit of guided light power in the single-mode fiber a factor K couples to each mode of the multimode fiber. Thus, the intensity coupling ratio from the single-mode fiber to the multimode fiber is $$K + K + \ldots + K = NK \quad (1)$$

In contrast, when one unit of light power is propagating in the multimode fiber, each mode carries 1/N unit of power with a factor K of it coupled into the single-mode fiber. Thus, the total intensity coupling ratio from the multimode fiber to the single-mode is $$1/N \times K + 1/N \times K + \ldots + 1/N \times K = K \quad (2)$$

The coupling ratio from the single-mode fiber to the multimode fiber is N times that from the multimode fiber to the single-mode fiber.

Therefore, in contrast to standard symmetric couplers, the single mode fiber to multimode fiber coupler is a nonreciprocal (asymmetric) coupler. This property provides another option for enhancing the performance of the state-of-the-art fiber processors and designing processors.

In some applications the input signal from the the input optical fiber bus 14 may be a continuous wave optical signal. In accordance with one embodiment of this invention, the input optical fiber bus 14 is a single-mode optical fiber, the output bus 16 is a multimode optical fiber, and the couplers 18A, 18B, etc., are asymmetrical single-mode to multimode optical signal coupling devices. The output fiber 16 is looped backward through each of the couplers 18A, 18B, etc.

These couplers preferably have adjustable coupling ratios, but fixed ratios may be used in some applications. The coupling ratios of various ones of the couplers 18A, 18B, etc., are selected for the particular application for which the lattice structure is used. In a sensor, the couplers 18A, 18B, etc., may all have the same coupling ratios.

In signal processing applications, the coupling ratios may be different. For example, the array may be used for multiplying matrices. The operation of the lattice as a systolic multiplier is described by M. Tur, et al, "Fiber Optic Signal Processing with Applications to Matrix-Vector Multiplication and Lattice Filtering," *Optic Letters*, V-7, N-9, pp. 463–465, September 1982 and B. Moslehi, et al., "Fiber-Optic Lattice Signal Processing," *IEEE Proceedings*, Vol. 72, No. 7, pp. 909–930 (1984). Both of these two documents are incorporated by reference into this disclosure.

The lattice 10 is easier to adjust than conventional lattice structures since the coupling ratio adjustments are less interdependent. This is because the major portion of light traveling in the single-mode fiber 14 is coupled into the multimode fiber 16, whereas only a small amount of light traveling in the multimode fiber 16 is coupled back into the single-mode fiber 14. These coupling characteristics provide an increase in the average duty cycle and overall efficiency of the device.

Figure 4:
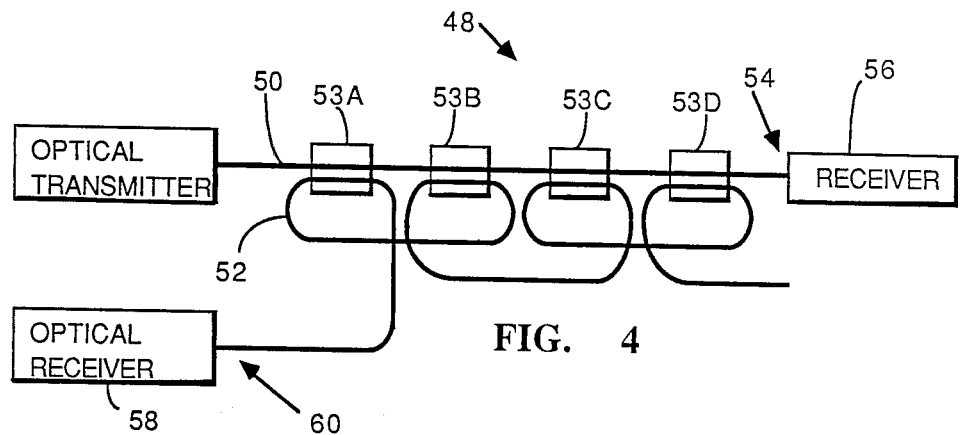
FIG. 4 illustrates a second embodiment of the invention.

FIG. 4 refers to an alternate embodiment of this invention which operates in a forward flow operational mode. A lattice 48 comprises an input bus 50 formed of a multimode optical fiber and a receive bus 52 formed of a single-mode optical fiber. Couplers 53A, 53B, etc., couple light between the fibers 50 and 52. The output port is the end 54 of the bus 50. In this embodiment of the invention only a small amount of light is coupled from fiber 50 into fiber 52. Thus, a receiver 56 is connected to the end 54 of the fiber 50 to use the maximum available light output. A receiver 58 may be connected to the end 60 of fiber 52 in an application where the much lower value of output light and the differently processed light signal there has utility. Advantages of this structure are particularly related to the application of the lattice structure. Also, the optical source may be an inexpensive LED device instead of a more expensive laser diode.

The lattice structures 10 and 48 described above may be used in systems that sense changes in a physical parameter, such as acoustic pressure. In such systems a long length of one of the fibers is sensitized to a particular field quantity (pressure, magnetic field, electric field, etc) and tapped periodically. An optical pulse of peak intensity $I_o$ and width $\tau$ seconds is injected into the transmit fiber 14 so that it propagates through the array 10, for example. As the pulse transits each sensor segment, picking up both a static phase delay $\theta_m$ and a dynamic phase variation $\theta_m(t)$. The static phase delay arises from the time required for the pulse to propagate the quiescent length of each sensor segment. The dynamic phase variation arises from changes in the lengths of the segments that are exposed to variations in the field being measured.

The data from each segment is returned as a phase modulation on each return optical pulse. By comparing the phases of the pulses returned from consecutive segments one can measure the dynamic phase modulation that occurred at the latter sensing segment alone. A mismatched pathlength interferometer will perform the operation.

The loops in the receive fiber 16 and properly selected coupling constants cooperate to tap off a small portion of the pulse at each coupler 18A, 18B, etc. The tapped signals propagate to the receiver along the single receive fiber 16. The remainder of the power in the pulse continues on to the next sensitized segment.

Although the invention has been described with reference to certain preferred embodiments, the scope of the invention is not limited to the particular embodiments described. Rather, the scope and spirit of the invention are defined by the appended claims and equivalents thereof.

What is claimed is:

1. A feed backward fiber optic lattice structure, comprising:
   a first optical fiber bus formed of a single mode optical fiber;
   a second optical fiber bus formed of a multimode optical fiber;
   optical receiving means for receiving optical signals guided by the second bus; and
   a plurality of optical couplers formed between the first optical fiber bus and the second optical fiber bus, the optical couplers dividing the lattice into a multiplicity of segments, the second bus being formed into a loop around each optical coupler so that the output of any segment propagates through all the preceding segments before reaching the optical receiving means, at least one of the optical couplers having an asymmetrical coupling efficiency and being connected between the first and second optical fiber buses such that the amplitudes of recirculating pulses are attenuated.

2. The feed backward fiber optic lattice structure of claim 1, wherein all of the optical couplers have asymmetrical coupling efficiencies and are connected such that the amplitudes of recirculating pulses are attenuated.

3. A method for forming a feed backward fiber optic lattice structure, comprising the steps of:

guiding an incident optical signal on a single mode transmit optical fiber;

providing a return optical fiber formed of a multimode optical fiber for guiding signals in a direction opposite to the direction of the incident signal;

detecting optical signals from the return optical fiber with a detector;

connecting a plurality of optical couplers between the transmit and return optical fibers to divide the lattice into a multiplicity of segments;

forming at least one of the optical couplers to have an asymmetrical coupling efficiency;

connecting each of the optical couplers between the transmit and return optical fibers such that the amplitudes of recirculating pulses are attenuated; and forming a loop in the return fiber at each optical coupler so that the return signal from the mth lattice segment propagates through the first (m−1) lattice segments before impinging upon the detector.

4. The method of claim 3, further including the steps of:

forming all of the optical couplers to have asymmetrical coupling efficiencies; and connecting the couplers such that the amplitudes of recirculating pulses in the lattice are attenuated.

* * * * *